(12) United States Patent
Numata

(10) Patent No.: US 6,384,865 B1
(45) Date of Patent: May 7, 2002

(54) IMAGE SIZE CONVERSION INTERLACED FOR IMAGE DATA

(75) Inventor: Kohji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,836

(22) Filed: May 28, 1999

(30) Foreign Application Priority Data

May 28, 1998 (JP) .......................................... 10-147356

(51) Int. Cl.⁷ ................................................ H04N 7/01
(52) U.S. Cl. ....................... 348/448; 348/441; 348/445; 348/459; 387/298
(58) Field of Search ................................ 348/448, 446, 348/441, 443, 445, 447, 456, 458, 459, 715; 382/298, 299; H04N 7/01

(56) References Cited

U.S. PATENT DOCUMENTS

| | | | | |
|---|---|---|---|---|
| 4,789,893 A | * | 12/1988 | Weston | 348/448 |
| 4,866,520 A | * | 9/1989 | Nomura et al. | 348/441 |
| 5,287,189 A | * | 2/1994 | Ersoz et al. | 348/588 |
| 5,825,429 A | * | 10/1998 | Shirahata | 348/448 |
| 5,832,124 A | * | 11/1998 | Sato et al. | 382/238 |
| 5,852,473 A | * | 12/1998 | Horne et al. | 348/558 |
| 5,883,671 A | * | 3/1999 | Keng et al. | 348/397 |
| 6,040,869 A | * | 3/2000 | Dischert | 348/448 |
| 6,166,733 A | * | 12/2000 | Greggain et al. | 348/448 |

FOREIGN PATENT DOCUMENTS

| | | |
|---|---|---|
| JP | 6-205375 | 7/1994 |
| JP | 8-98152 | 4/1996 |
| JP | 3-14421 | 11/1996 |
| JP | 9-219820 | 8/1997 |

* cited by examiner

Primary Examiner—Wendy R. Garber
Assistant Examiner—Jean W. Désir
(74) Attorney, Agent, or Firm—Foley & Lardner

(57) ABSTRACT

In an image converting apparatus for converting image data of a field format in which a frame consists of a first field and a second field into image data of a resultant frame with a predetermined size. The apparatus includes an even-numbered field decoder for decoding each line of scanning line data of the even-numbered field, an odd-numbered field decoder for decoding scanning line data of the even-numbered field by thinning out every second line, and an original image frame buffer for combining the decoded image data with each other into one frame of image data and for storing the resultant data therein.

10 Claims, 10 Drawing Sheets

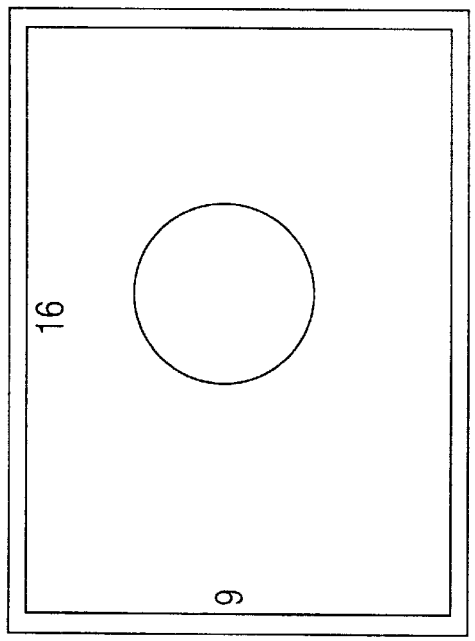
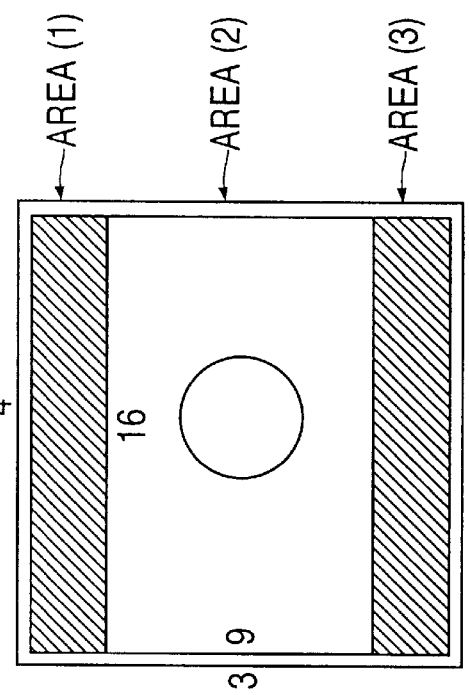
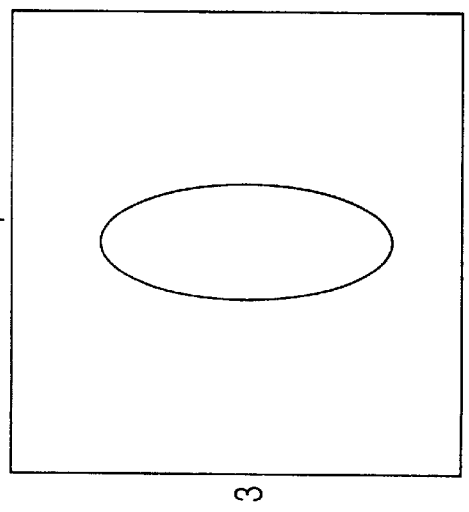

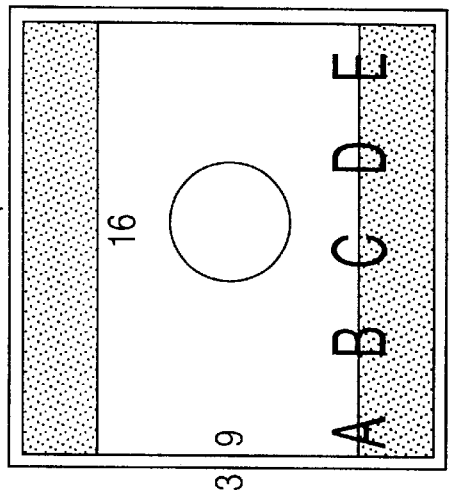
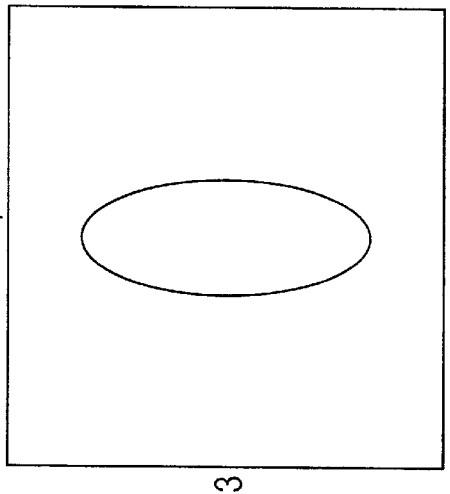

IMAGE SIZE CONVERSION INTERLACED FOR IMAGE DATA

BACKGROUND OF THE INVENTION

1. Field of the Invention

The present invention relates to a method of and an apparatus for converting interlaced image data used in the National Television System Committee (NTSC) system, the phase alteration line (PAL) system, and the like, namely, an image data having a field format in which a frame consists of an even-numbered field and an odd-numbered field into image data of a resultant frame with a predetermined size.

2. Description of the Prior Art

FIG. 1 shows an outline of constitution of an image size converting apparatus described in Japanese Patent Application No. 9-347044. The apparatus includes a table generator 110, a table memory 120, an image decoder 130, an original frame buffer 140, an image converter 150, a converted image frame buffer 160, a display controller 170, and a display 180.

The table generator 110 includes a size conversion table generator 111 and a correcting position table generator 112. The table generator 111 determines a conversion ratio, e.g., a reduction ratio in accordance with an original image size and a converted image size specified by a user to generate according to the ratio a size conversion table in which lines to be thinned out are specified. The correcting position table generator 112 generates according to the conversion ratio a correcting position table in which lines on which a filtering operation (correction) is to be conducted are specified. The tables thus created are stored respectively as a size conversion table 121 and a correcting position table 122 in table memory 120.

The image decoder 130 includes an even-numbered field decoder 131 which decodes an image signal inputted thereto to store therein image data of the even-numbered field and an odd-numbered field decoder 132 which decodes an image signal inputted thereto to store therein image data of then odd-numbered field. Stored in the frame buffer 140 is one frame of original image associated with the image data of the even-numbered field and that of the odd-numbered field stored in the decoder 131 and 132, respectively.

The image converter 150 includes a size converter 151 and a filter 152. The size converter 151 reads one frame of image data from the buffer 140 and converts the data size thereof in accordance with the size conversion table 121 prepared in the table memory 120. The filter 152 reads one frame of image data from the frame buffer 140 and filters the image data according to the correcting position table 122 stored in the table memory 120. After the size conversion and the filtering operation, the image data is stored in the frame buffer 160.

The display control section 170 reads one frame of converted image data from the frame buffer 160 and presents an image of the data on the display 180 at timing to display mobile images.

In the conventional image size converting apparatus configured as above, an image signal is supplied to the original image decoder 131 and a converted size specified by the user is supplied to the table generator 110. In the table generator 110, in accordance with the conversion ratio determined by the converted size and the original image size, the size conversion table generator 111 generates a size conversion table which specifies horizontal lines to be thinned out from the original image data (frame image). Moreover, the correcting position table generator 112 generates a correcting position table which specifies horizontal lines to be filtered in the original image data (frame image). These tables are placed in the table memory 120.

On the other hand, in the image decoder 130 having received the image signal, even-numbered and odd-numbered field decoders 131 and 132 decode the input image signal and respectively stores therein image data of the even-numbered field and that of the odd-numbered field. Thereafter, one frame of the original image based on the image data of even-numbered and odd-numbered fields is stored in the frame buffer 140.

When one frame of original image data is stored in the frame buffer 140, the data is read therefrom by the image converter 150. In the image converter 150, the size converter 151 thins out horizontal lines of the original data as specified by the size conversion table 121 and the filter 152 filters horizontal lines of the original image data in accordance with the correcting position table 122.

After the thinning-out and the filtering are finished as above, the resultant image data is once written in the converted image frame buffer 160. The data is then read therefrom by the display controller 170 to be presented on the display 180.

In addition to the image size converting apparatus, as an example of such an apparatus achieving the thinning out operation and the image compression, an image size reducing apparatus is described in Japanese Patent Laid-Open No. 9-219820. In the apparatus, original image data is formed in a frame each including an odd-numbered field and an even-numbered field in an interlaced manner. To compress the data in a vertical direction with a compression rate of N/M (N<M), the line numbers required to thin out almost uniformly (M−N) lines from successive M lines in the frame are specified in each of the odd-numbered and even-numbered fields. The original data is thinned out according to the specified line numbers. In the configuration of the apparatus, the original image can be compressed through the thinning out operation while preventing deterioration in information quality of the image.

Japanese Patent Laid-Open No. 8-314421 describes a display including a liquid-crystal display panel having 234 scanning lines and an aspect ratio of 4/3. In the display, a video signal received is thinned out to be compressed with a compression ratio of 3/4. The compressed image having an aspect ratio of 16/9 is displayed in a central zone of the panel and a mask such as a black band is displayed on 30 lines respectively over and below the displayed zone of the panel.

However, the image size converting apparatuses of the prior art are attended with problems as follows.

In the apparatus of Japanese Patent Application No. 9-347044, the even-numbered and odd-numbered field decoders 131 and 132 of the image decoder 130 decode all lines of the input image signal independently of the thinning out operation conducted later by the size converter 151. Therefore, the decoder 130 decodes lines which are not to be displayed, namely, which are to be thinned out by the size converter 151. That is, the decoding time is elongated by the unnecessary decoding.

Additionally, since the size conversion table 121 and the correcting position table 122 are first generated to convert the image size according thereto, there is required a table memory to store the tables 121 and 122. This is disadvantageous in consideration of the production cost.

The above problem is also present in the apparatuses of Japanese Patent Laid-Open Nos. 9-219820 and 8-314421.

Although various proposals have been offered as technologies associated with the interlacing scanning, the above problem cannot be solved.

SUMMARY OF THE INVENTION

It is therefore an object of the present invention to provide an image converting method and an image converting apparatus in which unnecessary processing time is required for the data decoding operation, thereby solving the above problems.

Further, another object of the present invention is to provide an image converting method and an image converting apparatus in which neither the size conversion table nor the correcting position table are required.

To achieve the above object in accordance with the present invention, there is provided an image converting apparatus for converting image data having a field format in which a frame consists of a first field and a second field into image data of a resultant frame with a predetermined size. The apparatus includes first decoding means for decoding each scanning line data of the first field of the compressed image data, second decoding means for decoding scanning line data of the second field of the compressed image data-while thinning out every second line, and first storage means for storing a frame image data combined with image data decoded by the first decoding means with image data decoded by the second decoding means.

The image converting apparatus may further include correcting means for correcting a time difference between the first and second fields for the lines decoded by the second decoding means of the lines of image data read from the first storage means, and second storage means for storing therein image data undergone the correction by the correcting means, in the form of 1-frame image data.

Moreover, the image data converting apparatus may further include black line data area setting means for setting black line data areas respectively over and below the image data read from the first storage means, each of the black line data areas including lines the number of which is ⅛ that of lines of all scanning line data in the frame including the first and second fields of the compressed image data, and second storage means for storing therein image data including the black line data areas, in the form of 1-frame image data.

Additionally, the second storage means may store image data, which has undergone the correction and which includes the black line data areas, in the form of 1-frame image data.

The apparatus above may further includes third decoding means for decoding compressed image data in a frame format, third storage means for storing therein image data decoded by the third decoding means, image synthesizing means for combining the image data stored in the second storage means with that stored in the third storage means and for thereby synthesizing image data, and fourth storage means for storing therein the image data synthesized by the image synthesizing means, in a form of 1-frame image data.

In accordance with the present invention, there is provided an image conversion method of converting compressed image data having a field format in which a frame consists of a first field and a second field, into image data of a frame format with a predetermined size. The method includes the steps of decoding each scanning line data of the first field of the compressed image data, decoding scanning line data of the second field of the compressed image data while thinning out every second line, and combining image data decoded for the first field with image data decoded for the second field, thereby producing frame image data.

The decoding method may further include the step of correcting a time difference between the first and second fields for the lines corresponding to the decoded lines of the second field of the combined lines of the frame image data.

In addition, the decoding method may further include the step of setting black line data areas respectively over and below the frame image data generated by combining the data decoded for the first field with that decoded for the second field, each of the black line data areas including lines the number of which is ⅛ that of lines of all scanning line data in the frame including the first and second fields of the compressed image data, thereby producing image data for an image with an aspect ratio of 4/3.

The image conversion method may further include the steps of setting black line data areas respectively over and below the frame image data generated by combining the data decoded for the first field with that decoded for the second field, each of the black line data areas including lines the number of which is ⅛ that of lines of all scanning line data in the frame including the first and second fields of the compressed image data, thereby producing image data for an image with an aspect ratio of 4/3, and correcting a time difference between the first and second fields for lines of image data read from the first storage means, the lines corresponding to the lines associated with the data for the second field.

In the conversion method above, there may be further included the step of combining the frame image data, which includes the black line data areas and which has undergone the correction, with the image data obtained by decoding compressed data of a frame format, thereby synthesizing one frame of image data.

As above, while each line of scanning line data of the first field is decoded, the scanning line data of the second field is thinned out on alternate lines and decoded. Consequently, the number of lines of the frame thus decoded is ¾ of that of the frame including the first and second fields before the decoding. For example, if the frame, which has an aspect ratio of 4/3, consists the original first and second fields, the image data obtained through the decoding of the first and second decoding means has an aspect ratio of 16/9.

As described above, due to the thinning out operation, the image is minimized. Namely, the image size is converted through the decoding operation in accordance with the present invention. Therefore, the size conversion table used in the conventional technology can be dispensed with. Moreover, only the lines which are displayed later are decoded.

In accordance with the present invention, for the resultant data of the second field in which only every second line is thinned out in the decoding operation, a correction is conducted with respect to time difference between the first and second fields. In short, the correction cannot be carried out for the lines thinned out and hence the correction time is reduced. In addition, since the correcting position table of the prior art is not required in the correction, it is possible to avoid the disadvantage of increase in the production cost.

In accordance with the present invention, since neither the size conversion table nor the correcting position table is necessary, it is possible to provided an image conversion method and an image converting apparatus with a lower cost.

Furthermore, the conventional operation to decode the lines which are not to be displayed is removed in accordance with the present invention. Consequently, there can be provided an image conversion method and an image converting apparatus in which the conventional decoding operation not required is suppressed in the decoding operation.

The above and other objects, features, and advantages of the present invention will become apparent from the following description with reference to the accompanying drawings which illustrate examples of the present invention.

BRIEF DESCRIPTION OF THE DRAWINGS

In the accompanying drawings:

FIG. 3a is a schematic diagram showing an example of compressed image data with an aspect ratio of 4/3;

FIG. 3b is a schematic diagram showing an image with an aspect ratio of 16/9 displayed in an entire screen, the image being obtained by converting the compressed image data of FIG. 3a;

FIG. 3c is a schematic diagram showing an image with an aspect ratio of 16/9 displayed in an entire screen with an aspect ratio of 4/3, the image being obtained by converting the compressed image data of FIG. 3a;

FIG. 8a is a schematic diagram showing an example of compressed image data;

FIG. 8b is a diagram schematically showing an example of compressed subordinate image data; and FIG. 8c is a schematic diagram showing an image synthesized by combining the compressed image data of FIG. 8a with the compressed subordinate image data of FIG. 8b.

DESCRIPTION OF THE PREFERRED EMBODIMENTS

Referring next to the drawings, description will be given of an embodiment of the present invention.

Figure 1:
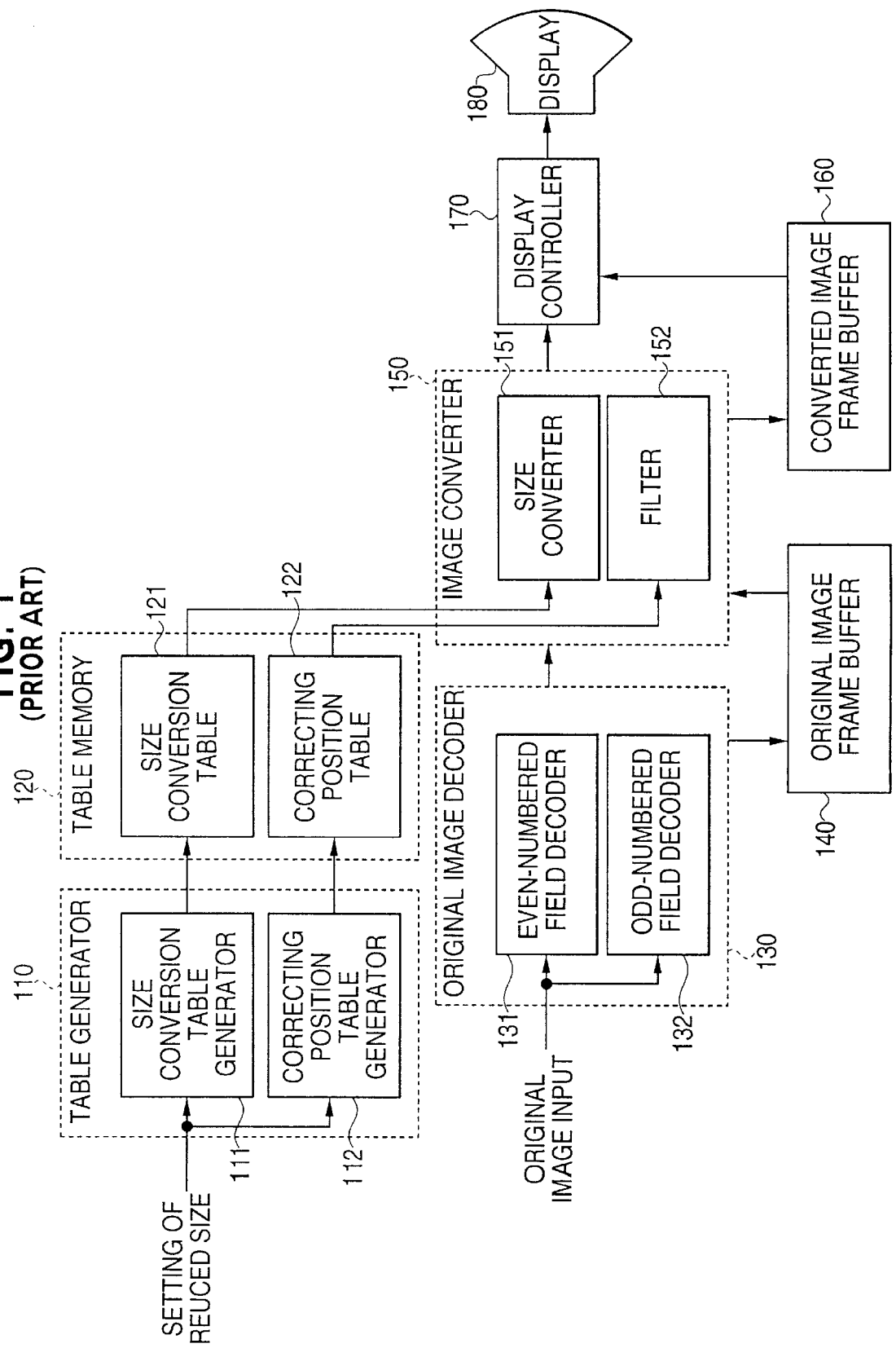
FIG. 1 is a block diagram showing an outline of constitution of the image size converting apparatus described in Japanese Patent Application No. 9-347044.
Figure 2:
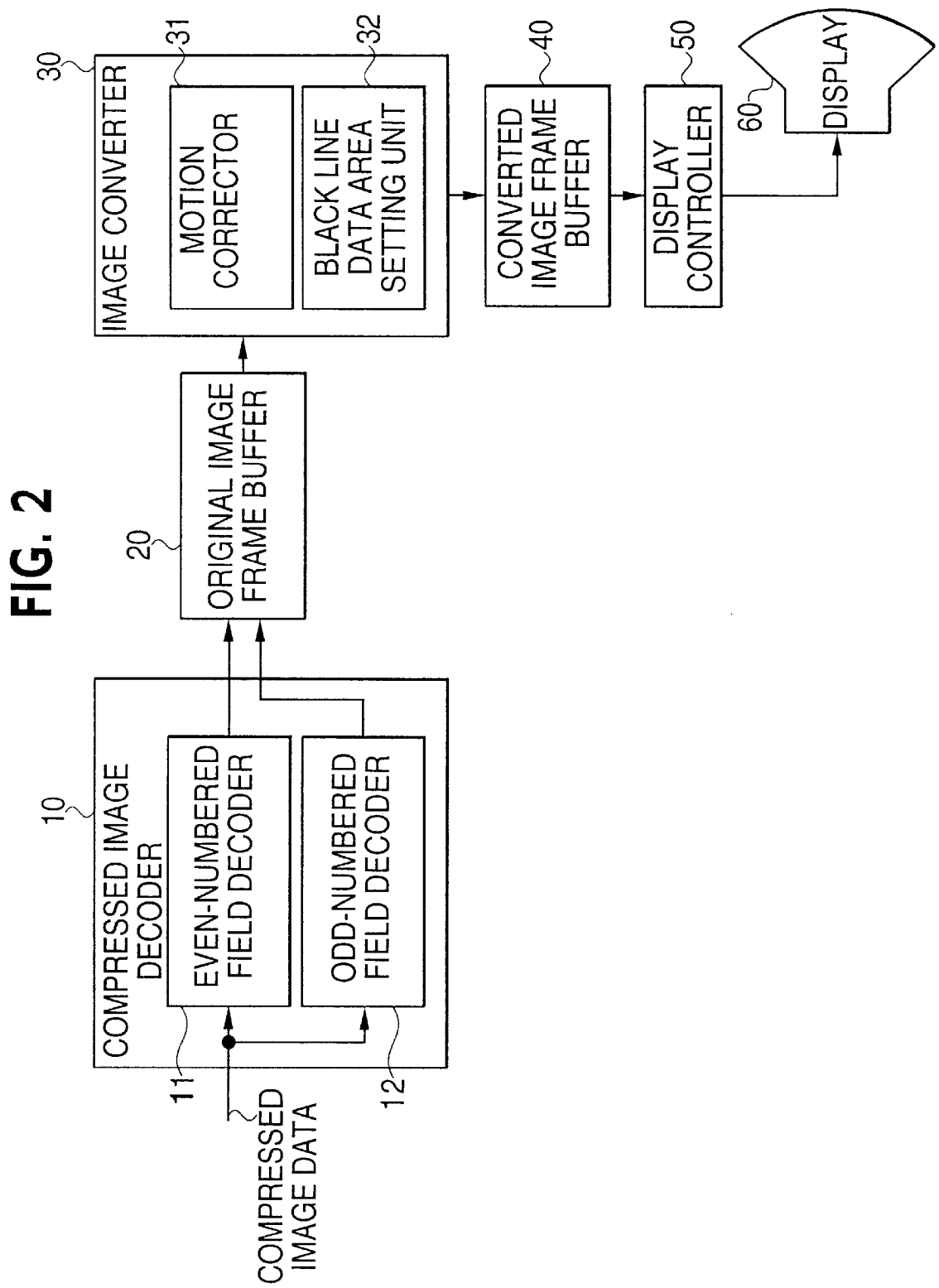
FIG. 2 is a block diagram showing an embodiment of an image converting apparatus in accordance with the present invention.

FIG. 2 shows an embodiment of an image converting apparatus in accordance with the present invention. The image converting apparatus is an apparatus for converting interlaced image data such as the television signal now in use which employs an interlaced scanning, namely, an image data having a field format in which a frame consists of an even-numbered field and an odd-numbered field into an image of a resultant frame format with a predetermined size. In FIG. 2 a configuration of the apparatus including a display control function is illustrated.

The image converting apparatus of FIG. 2 includes a compressed image decoder 10, an original image frame buffer 20, an image converter 30, a converted image frame buffer 40, a display controller 50, and a display 60.

The display image decoder 10 includes an even-numbered field decoder 11 and an odd-numbered field decoder 12. A compressed image in a field format from an external compressed image supply unit is supplied to inputs of the decoders 11 and 12, respectively. The decoder 11 decodes each line (i.e., each horizontal line) of an even-numbered field of the compressed image. The decoder 12 decodes a line of an odd-numbered field of the compressed image while thinning out a line on alternate lines. After decoding by the decoder 12, the number of line s of the odd-numbered field is half the number before the decoding.

The original image frame buffer 20 stores one frame of composite data combining image data of the even-numbered field decoded by decoder 11 with that of the odd-numbered field decoded by decoder 12. Since the decoder 12 thins out a line of the received data on alternate lines, the number of lines of one frame of the composite image data stored in the buffer 20 is ¾ of that of one frame of the compressed image received from the external unit. As a result, the image size is reduced to ¾ of the original size in the vertical direction of the image.

The image converter 30 includes a motion corrector 31 and a black line data area setting unit 32. A frame image data from the buffer 20 is supplied to inputs of the motion corrector 31 and the data area setting unit 32, respectively. The motion corrector 31 performs a motion correction for the lines corresponding to odd-field lines decoded by the decoder 12 to thereby correcting a time difference (ordinarily ¹⁄₆₀ second) between the even-numbered and odd-numbered fields. The data area setting unit 32 performs a image conversion to display the frame image data in the fullness of the width on the display 60 having an aspect ratio of 4/3. The operation of data area setting section 32 will be next described.

To convert image data having an aspect ratio of 4/3 as shown in FIG. 3a into image data with an aspect ratio of 16/9 for presentation thereof, two cases can be considered. First, the converted data with an aspect ratio of 16/9 is fully displayed on a screen having the same aspect ratio as shown in FIG. 3b. Second, the converted data is aligned to the width of a screen with an aspect ratio of 4/3 and displayed in the fullness of the width on the screen as shown in FIG. 3c. In this embodiment, the data area setting unit 32 achieves an image conversion to display an image of FIG. 3c. Specifically, the data area setting unit 32 generates image data of one frame including areas (1) and (3) in which black line data is displayed and area (2) in which the converted image data is displayed as shown in the display example of FIG. 3c.

The buffer 40 stores a frame image data converted by the image converter 30. In the operation above, image data of one frame including area (2) of the image data after a motion correction by the corrector 31 and areas (1) and (3) for black line data is stored in buffer 40.

The display controller 50 reads a frame image data from the buffer 40 and sends the read data to the display 60 to present an image thereon at a display timing (frame timing) of mobile pictures. The display 60 has an aspect ratio of 4/3.

Subsequently, description will be given of operation of the image size converting apparatus.

Figure 4A:
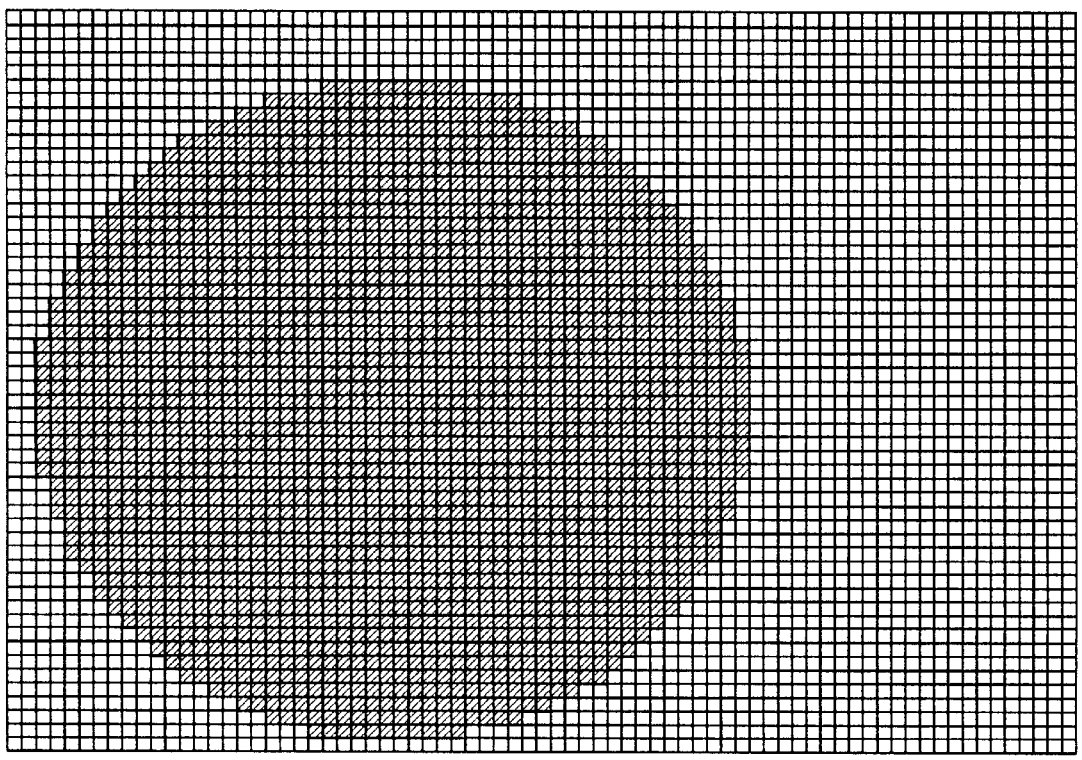
FIG. 4a is a schematic diagram showing a circular object as an example of the compressed image having a field format.
Figure 4B:
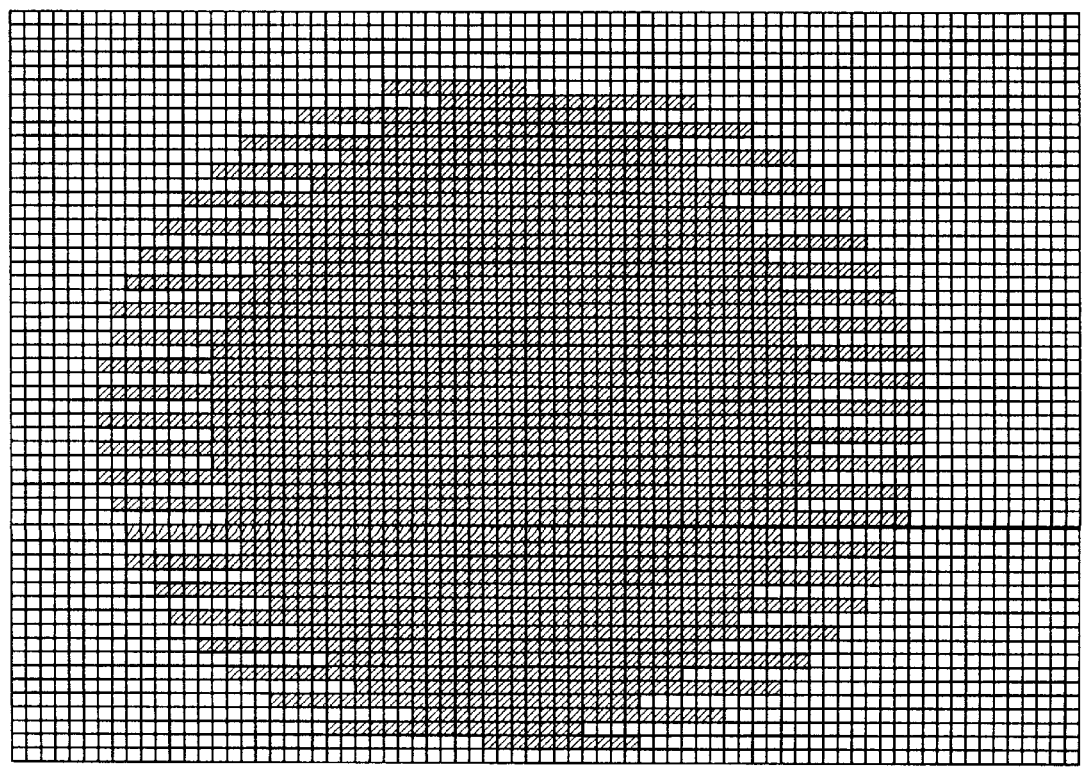
FIG. 4b is a schematic diagram showing image distortion or deformation between even-numbered and odd-numbered fields.
Figure 4C:
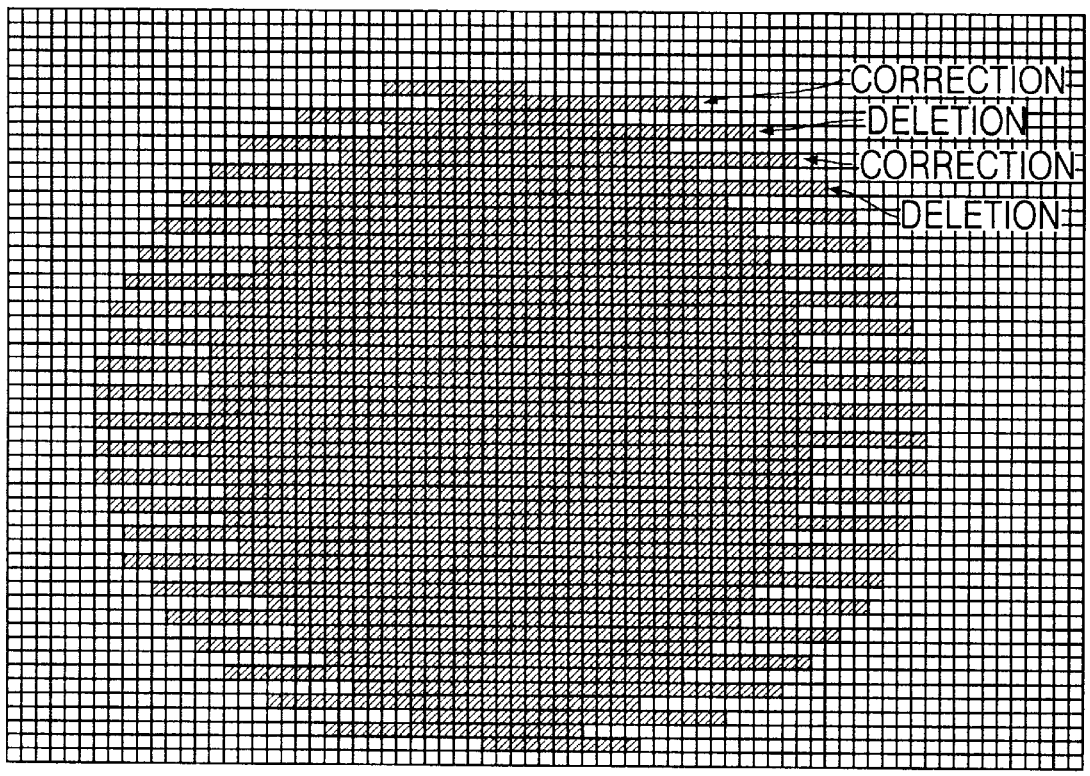
FIG. 4c is a schematic diagram showing lines to be thinned out in the image data of FIG. 4b and lines for which a motion correction is to be conducted in the image data of FIG. 4b.
Figure 4D:
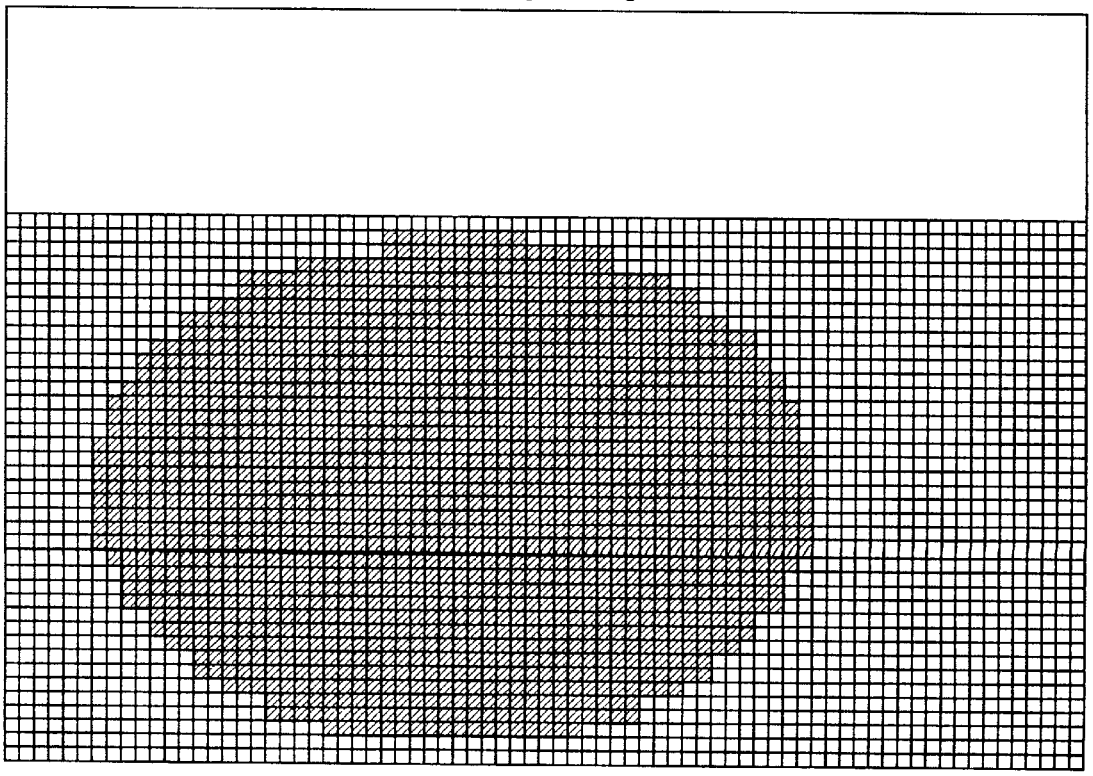
FIG. 4d is a schematic diagram showing the image data after the thinning out operation and the motion correction.

In a case in which an image signal of a circular object (FIG. 4a) moving rightwards at a high speed is inputted as a compressed image with a field format to the apparatus, when the image is entirely decoded without thinning out any line of the even-numbered and odd-numbered fields to resultantly generate image data of one frame with an aspect ratio of 4/3 including both fields, a time difference of 1/60 second (image distortion) takes place between the even-numbered and odd-numbered fields as shown in FIG. 4b. When a line for either one of the even-numbered and odd-numbered fields of the image data is thinned out on alternate lines and the motion correction is carried out for the lines not thinned out as shown in FIG. 4c, so that it is possible to obtained an image without any distortion with the image size reduced to 3/4 of the original size in the vertical direction of the image. Namely, the image has an aspect ratio of 16/9. In this embodiment, the image data is minimized in its vertical size in the decoding operation, and the motion correction (correction of image distortion) is accomplished for the decoded image data. The operation will be next described in detail.

Figure 5A:
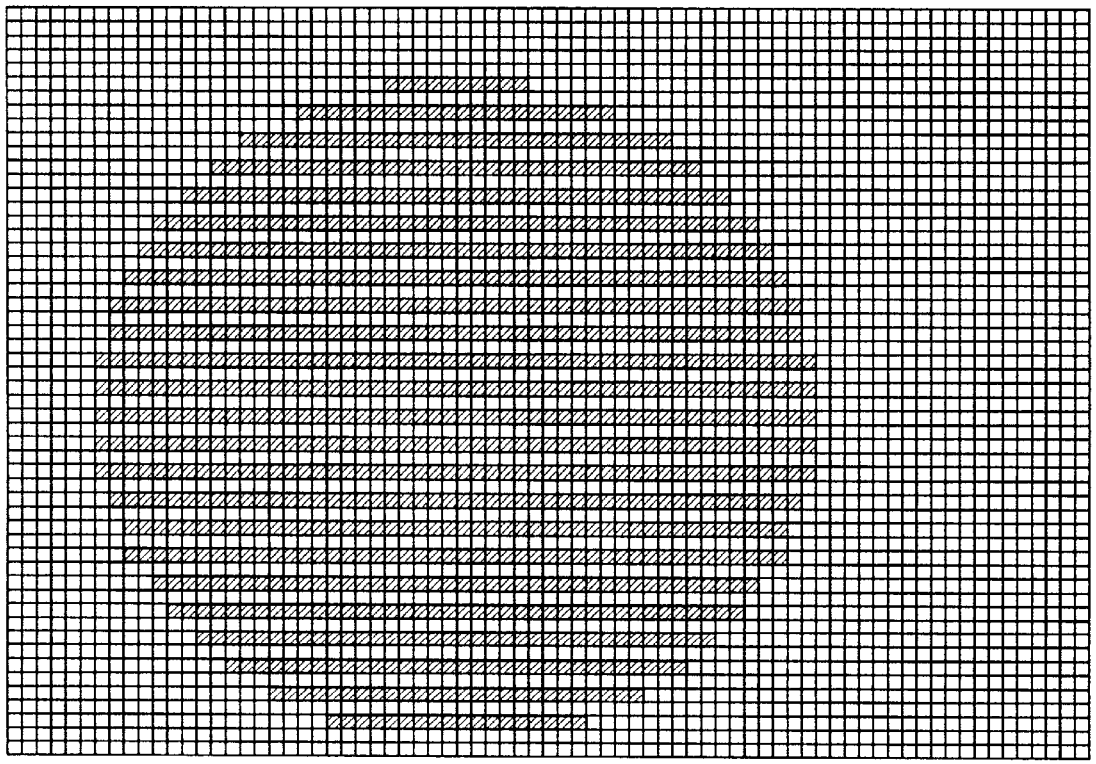
FIG. 5a is a schematic diagram showing image data decoded by an even-numbered field decoder section.
Figure 5B:
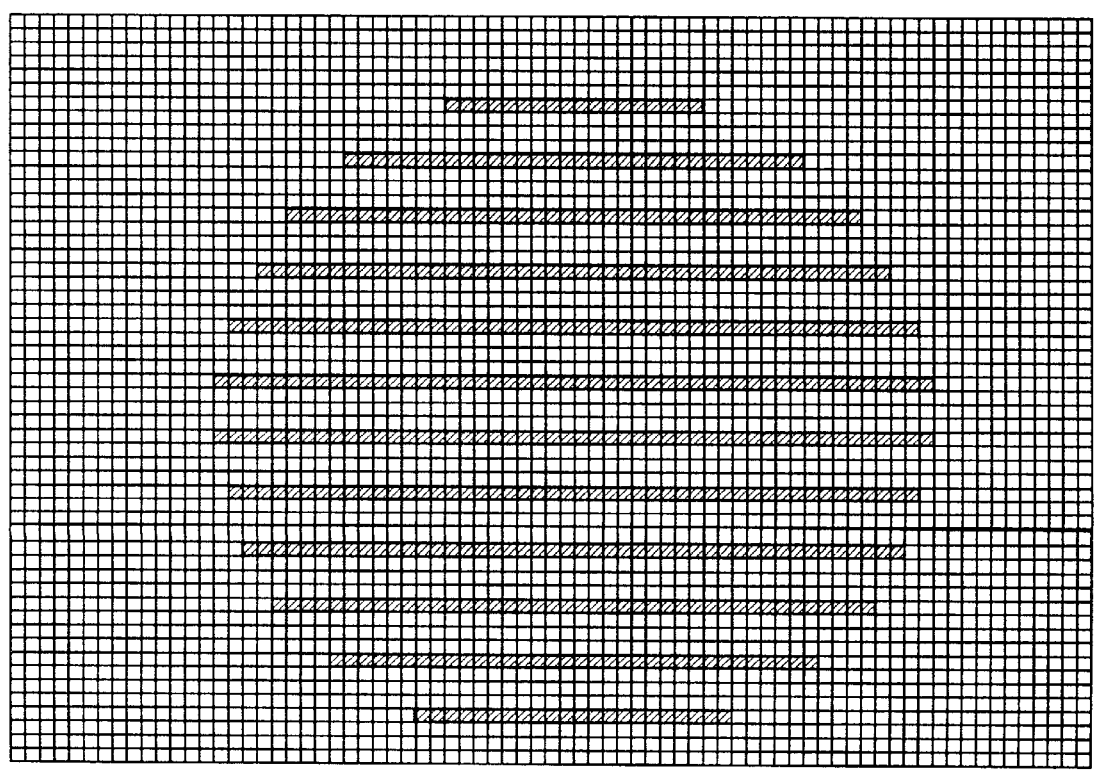
FIG. 5b is a schematic diagram showing image data decoded by an odd-numbered field decoder section.

A compressed image of a field format received from the external unit is decoded for even-numbered and odd-numbered fields thereof by the compressed image decoder 10. In the embodiment, an even-numbered field of the compressed image is decoded for each line of the field by the decoder 11. An odd-numbered field of the compressed image is thinned out every second line of the field and decoded for the lines not thinned out by the decoder 12. Consequently, the decoder 11 produces an image data in which each line of the original field is decoded (FIG. 5a), the decoder 12 creates an image data in which every second line is thinned out and the lines thinned out are decoded (FIG. 5b).

Figure 5C:
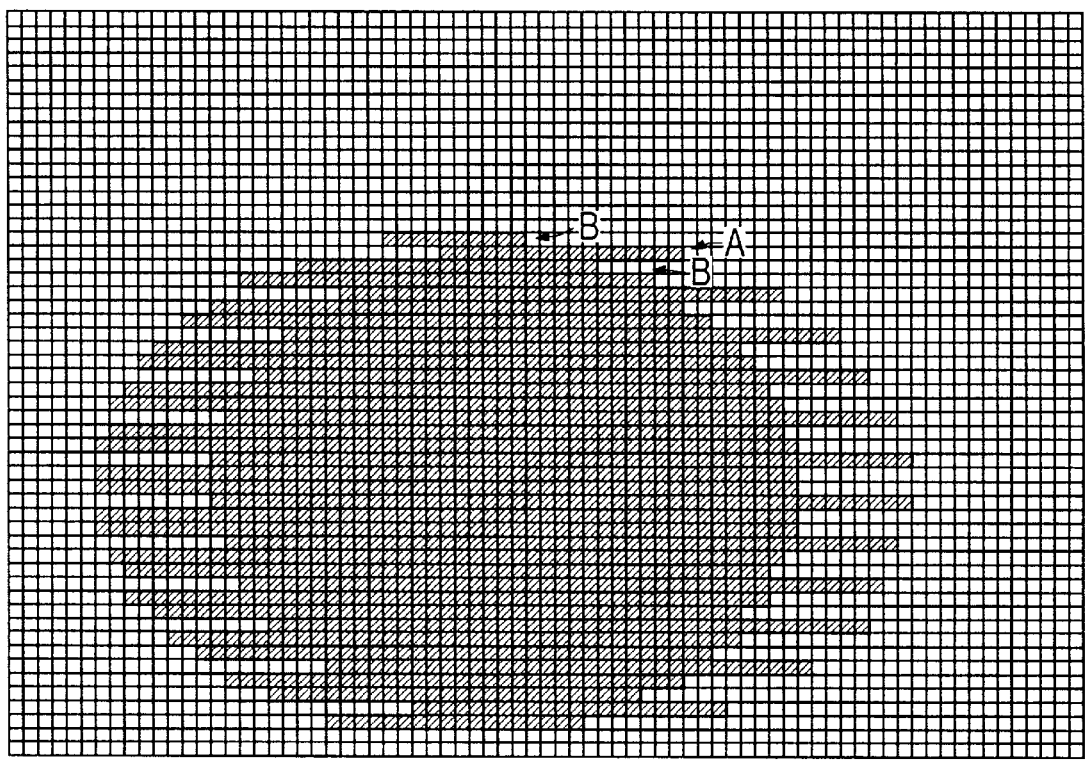
FIG. 5c is a diagram schematically showing image data stored in an original image frame buffer.

After the compressed image is decoded by the decoders 11 and 12, image data of one frame including both the decoded data is stored in the buffer 20. In this situation, the data stored in the buffer 20 has a time difference (image distortion) of 1/60 seconds between the even-numbered and odd-numbered fields as shown in FIG. 5c.

The image data (decoded data) in the buffer 20 is then read therefrom by the converter 30 in which an image conversion and a motion correction are accomplished for the read data. Image data thus processed is stored in the buffer 40. The sequence of operations conducted by the converter 30 will be next described in detail.

Figure 6:
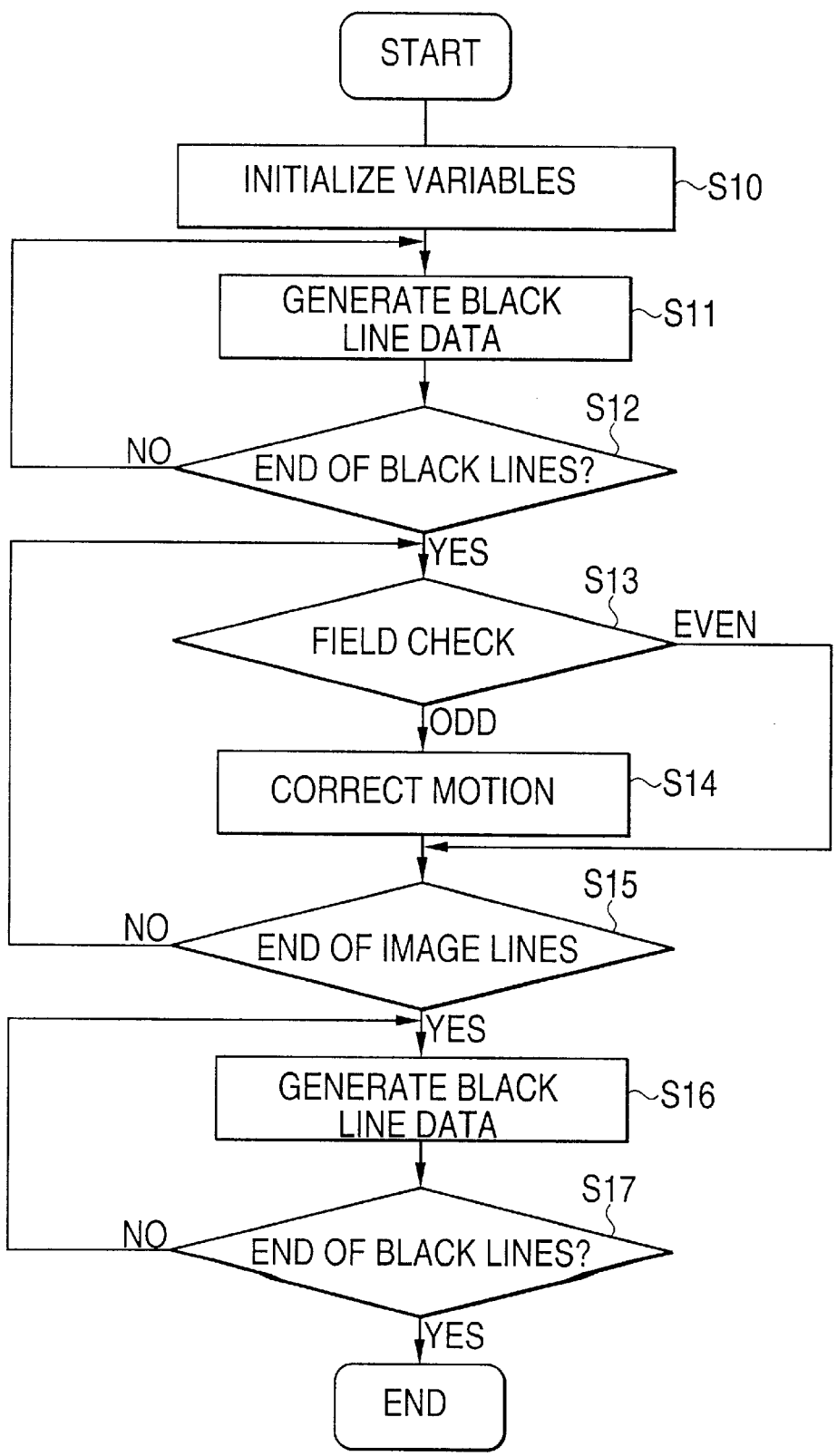
FIG. 6 is a flowchart showing a sequence of operations executed by an image converter section of the image converting apparatus shown in FIG. 2.

Referring to FIG. 6, at step S10, initialized variables such as a pointer and an image size for each of buffers 20 and 40, numbers of lines respectively of areas (1) to (3) shown in FIG. 3c are initialized. With the initializing, for example, when the compressed image supplied from an external unit includes 480 lines per frame including even-numbered and odd-numbered fields, "480 lines" is set as the image size and then the number of lines is accordingly set to each of areas (1) to (3). For areas (1) and (3), 480/8="60 lines" is designated; whereas, for area (2), 480×3/4="360 lines" is specified. In the embodiment, the pointer value is set to "1" for both buffers 20 and 40.

After the line numbers of areas (1) to (3) are specified as above, image data is generated for these areas to be stored in the buffer 40 at steps S11 to S17 as follows.

At step S11, one line of black line data is generated to be stored to an address in the buffer 40 specified by the pointer value ("1" as the initial value). The black line data is generated by the black line data area setting unit 32.

Then at step S12, the confirmation whether or not the black line data has been generated for the number of the lines of area (1) is done. If not generated, the pointer value of the buffer 40 is increased by an increment and then the process return to step S11. Otherwise, the buffer pointer value is increased by an increment and the process goes to processing of step S13 and subsequent steps. In the embodiment, 60 lines of black line data for area (1) are created to be stored in locations of the buffer 40 respectively specified by pointer values "1" to "60" in steps S11 and S12.

At step S13, one line of decoded data is read from a location of the buffer 20 specified by the buffer pointer value (initialized to "1") and then it is confirmed whether the read data is associated with an even-numbered or odd-numbered field. If the read data belongs to an odd-numbered field, a motion correction is conducted for the read data and the resultant data is stored in a location of the buffer 40 specified by the buffer pointer value ("61" in this case) at step S14. If the read data belongs to an even-numbered field, the operation of step S14 is skipped and the read data is stored in a location of the buffer 40 specified by the buffer pointer value ("61" as above).

Figure 5D:
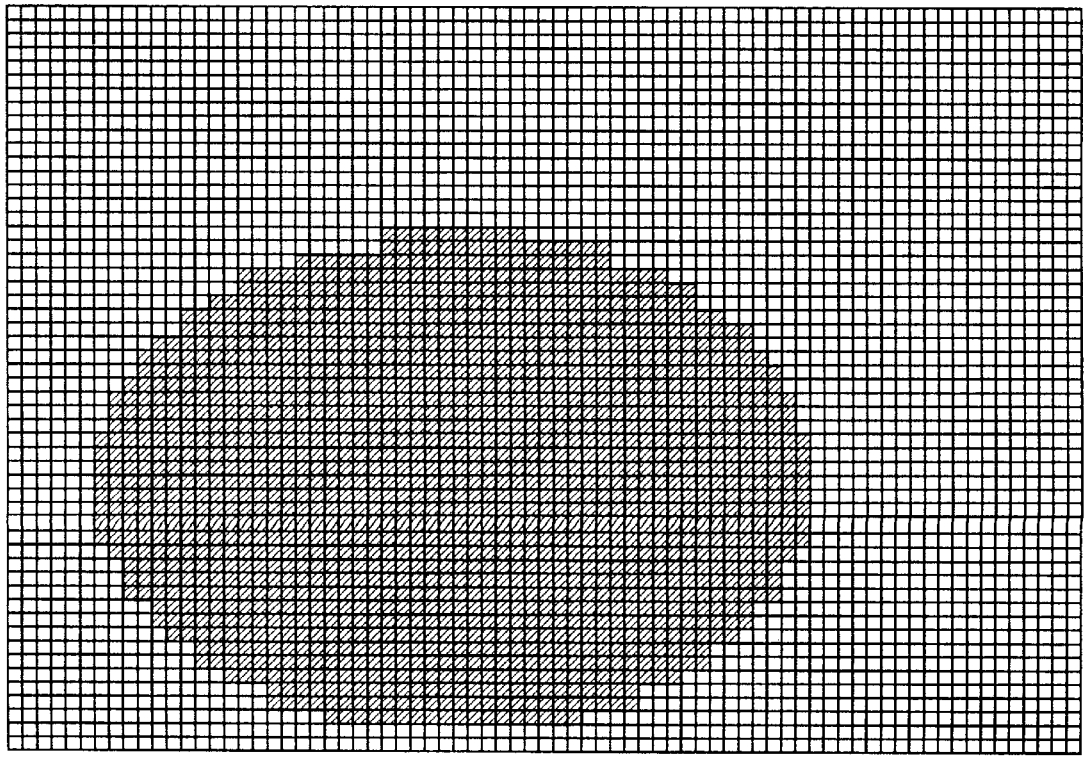
FIG. 5d is a schematic diagram showing image data stored in a converted image frame buffer.

The operation of step S14 is achieved by the motion corrector 31. For example, in the composite image data shown in FIG. 5c, each picture element of odd-field line A is compared with each picture element of the even-field lines B and B' adjacent thereto. Concretely, for every picture element of the odd-field line A, the value of the picture element is compared with that of two picture elements over and under it, which are in the even-field lines B and B'. Such comparison is carried out for each odd-field line. If the value is within a value range determined by values respectively of the upper and lower picture elements, the correction is not conducted. Otherwise, the value of the upper or lower picture element is used. Owing to this operation, the image is produced without image distortion as shown in FIG. 5d.

Then at step S15, the entire image data equivalent to the number of lines for the area (2) is read from the buffer 20 and a check is made to confirm whether or not steps S13 and S14 have been completely executed for the data (i.e., all image lines). If there still remains image data to be processed, each of the pointer values respectively of the buffers 20 and 40 is advanced by an increment and the process returns to step S13. If all image lines have already been processed, the pointer value of the buffer 40 is increased by an increment and the process is passed to step S16. In steps S13 to S15, 360 lines of image data are produced for the area (2) to be stored in locations of the buffer 40 designated by pointer values "61" to "420".

At step S16, one line of black line data is created and is then stored in a location of the buffer 40 specified by the pointer value ("421" at this point). Then at step S17, whether or not the black lines have been created for the lines of area (3) is confirmed. If not created, the pointer value of the buffer 40 is increased by an increment and the process returns to step S16. In other cases, the processing is terminated. Through steps S16 and S17, 60 lines of black line data are generated for area (3) and stored in locations of the buffer 40 respectively denoted by the pointer values "421" to "480".

When the image conversion and the motion correction are executed by the image converter 30 and the resultant image data is stored in the buffer 40 as mentioned above, the display controller 50 reads one frame of the image data from the buffer 40 and the drives display 60 to present the read data as a mobile picture at display timing of mobile pictures. To display mobile pictures, the sequence of operations from the decoding of compressed image to the display thereof need only be repeatedly conducted.

In the embodiment above, the even-numbered field decoder 11 decodes all lines of the even-numbered field and the odd-numbered field decoder 12 decodes lines of the odd-numbered field while thinning out every second line thereof. However, in contrast therewith, the operation may be conducted such that the odd-numbered field decoder 12 decodes all lines of the odd-numbered field and the even-numbered field decoder 11 decodes lines of the even-numbered field while thinning out every second line thereof. In this situation, consequently, the motion corrector 31 conducts the motion correction for the lines of a frame image data read from the buffer 20, the lines corresponding to those of the even-numbered field decoded by the decoder 11.

Additionally, when there is no necessity to consider the image distortion, the motion corrector 31 may be removed from the configuration shown in FIG. 2.

In the description of this embodiment, image data, which has an aspect ratio of 4/3 (FIG. 3a), having a frame which consists of an even-numbered field and an odd-numbered field is converted into image data with a frame aspect ratio of 16/9. The converted data is then displayed on a screen having an aspect ratio of 4/3 with the width thereof fully aligned to that of the screen (FIG. 3c). However, in addition to the presentation above, the converted data may be displayed entirely on a screen having an aspect ratio of 16/9 (FIG. 3b). In this operation, it may also be possible that the display controller 50 reads image data with an aspect ratio of 16/9 from the buffer 20 to display an image of the read data on the display 60. Alternatively, the motion corrector 31 may correct the image data with an aspect ratio of 16/9 read from the buffer 20 to store the corrected data in the buffer 40. Thereafter, the display controller 50 reads the image data from the buffer 20 and presents an image of the read data on the display 60.

ANOTHER EMBODIMENT

Figure 7:
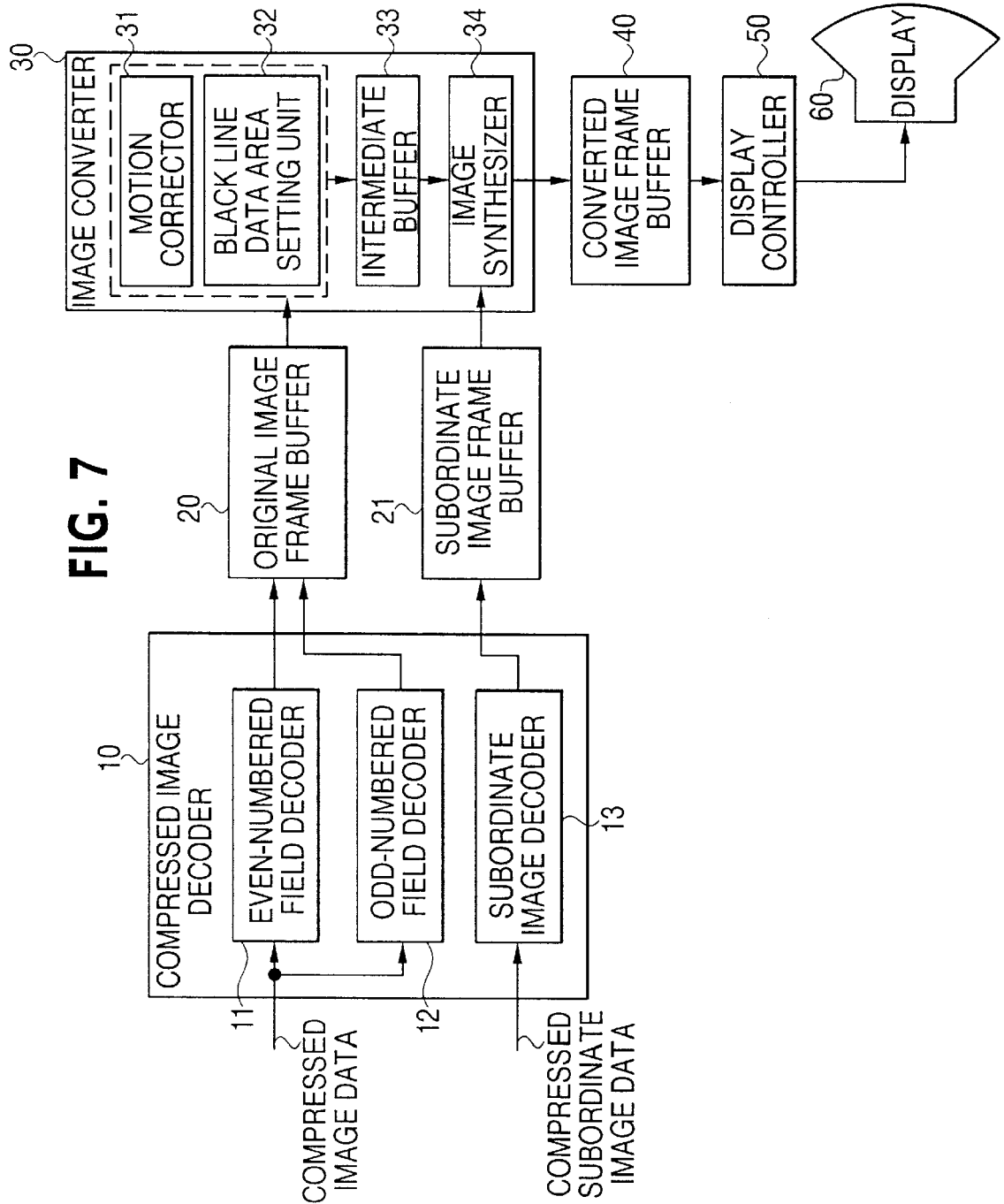
FIG. 7 is a block diagram showing another embodiment of the image converting apparatus in accordance with the present invention.

FIG. 7 shows an another embodiment of the image converting apparatus in accordance with the present invention. The apparatus includes, in addition to the constituent components of the image converting apparatus shown in FIG. 2, a subordinate image decoder 13, a subordinate image frame buffer 21, an intermediate buffer 33, and an image synthesizer 34. In FIG. 7, the same constituent components as those of FIG. 2 are assigned with the same reference numerals. For simplification of explanation, description will not be redundantly given of the duplicated components.

The subordinate image decoder 13 is disposed in the compressed image decoder 10 to decode a compressed subordinate image received from an external compressed subordinate image supplier. The subordinate image frame buffer 21 is used to store image data with an aspect ratio of 4/3 decoded by the decoder 13.

The intermediate buffer 33 is arranged in the image converter 30 to temporarily store image data having undergone motion correction by the motion corrector 31 and an image conversion by the black line data area setting unit 32, namely, one frame of image data for area (2) in which image data with an aspect ratio=16/9 corrected by the motion corrector 31 is displayed and areas (1) and (3) in which black line data is displayed. The image synthesizer 34 combines image data stored in the buffer 33 with image data with an aspect ratio of 4/3 stored in the buffer 21 to produce synthesized image data.

In this embodiment, the image data created by the synthesizer 34 is stored in the buffer 40. The display controller 50 then reads the synthesized image data from the buffer 40 and drives the display 60 to present an image of the synthesized image data thereon at mobile picture display timing. For example, when a compressed image of FIG. 8a and a compressed subordinate image shown in FIG. 8b are fed to the image converting apparatus, synthesized image data of FIG. 8c is displayed. Specifically, image data obtained from the compressed image of FIG. 8a, i.e., one frame of image data for area (2) for image data (aspect ratio=16/9) corrected by motion corrector 31 and for areas (1) and (3) for black line data is combined with an image data attained from the compressed subordinate image shown in FIG. 8b into a synthesized image to be presented on the display 60.

While preferred embodiments of the present invention have been described using specific terms, such description is for illustrates purposes only, and it is to be understood that changes and variations may be made without departing from the spirit or scope of the following claims.

We claim:

1. An image converting apparatus for converting compressed image data having a field format in which a frame consists of a first field and a second field into image data of a resultant frame with a predetermined size, comprising:

first decoding means for decoding each scanning line data of the first field of the compressed image data;

second decoding means for decoding scanning line data of the second field of the compressed image data while thinning out every second line; and first storage means for combining image data decoded by the first decoding means with image data decoded by the second decoding means and storing the combined data as a frame image data.

2. An image converting apparatus in accordance with claim 1, further comprising:

correcting means for correcting a time difference between the first and second fields for the lines decoded by the second decoding means of the lines of image data read from the first storage means; and second storage means for storing therein image data which has undergone correction by the correcting means, in the form of 1-frame image data.

3. An image converting apparatus in accordance with claim 1, further comprising:

black line data area setting means for setting black line data areas respectively over and below the image data read from the first storage means, each of the black line data areas including lines the number of which is ⅛ that of lines of all scanning line data in the frame including the first and second fields of the compressed image data; and second storage means for storing therein image data including the black line data areas, in the form of 1-frame image data.

4. An image converting apparatus in accordance with claim 1, further comprising:

black line data area setting means for setting black line data areas respectively over and below the image data read from the first storage means, each of the black line data areas including lines the number of which is ⅛ that of the lines of all scanning line data in the frame including the first and second fields of the compressed image data;

correcting means for correcting a time difference between the first and second fields for the lines decoded by the second decoding means of the lines of image data read from the first storage means; and second storage means for storing therein image data, which has undergone correction by the correcting means and which includes the black line data areas, in the form of 1-frame image data.

5. An image converting apparatus in accordance with claim 4, further comprising:

third decoding means for decoding compressed image data in a frame format;

third storage means for storing therein image data decoded by the third decoding means;

image synthesizing means for combining the image data stored in the second storage means with that stored in the third storage means and for thereby synthesizing image data; and fourth storage means for storing therein the image data synthesized by the image synthesizing means, in a form of 1-frame image data.

6. An image conversion method of converting compressed image data having a field format in which a frame consists of a first field and a second field, into image data of a frame format with a predetermined size, comprising the steps of:

decoding each scanning line data of the first field of the compressed image data;

decoding scanning line data of the second field of the compressed image data while thinning out every second line; and combining image data decoded for the first field with image data decoded for the second field, thereby producing frame image data.

7. An image conversion method in accordance with claim 6, further comprising the steps of:

combining the decoded data for the first filed with the decoded data for the second field; and correcting a time difference between the first and second fields for the lines corresponding to the decoded lines of the second field of the lines of the frame image which have been obtained by the combining.

8. An image conversion method in accordance with claim 6, further comprising the step of:

setting black line data areas respectively over and below the frame image data combined the decoded data for the first field with the decoded data for the second field, each of the black line data areas including lines the number of which is ⅛ that of lines of all scanning line data in the frame including the first and second fields of the compressed image data, thereby producing image data for an image with an aspect ratio of 4/3.

9. An image conversion method in accordance with claim 6, further comprising the steps of:

setting black line data areas respectively over and below the frame image data combined the decoded data for the first field with the decoded data for the second field, each of the black line data areas including lines the number of which is ⅛ that of lines of all scanning line data in the frame including the first and second fields of the compressed image data, thereby producing image data for an image with an aspect ratio of 4/3; and correcting a time difference between the first and second fields for the lines corresponding to the decoded lines of the second field of the lines of frame image data.

10. An image conversion method in accordance with claim 9, further comprising the step of:

combining the frame image data, which includes the black line data areas and which has undergone the correction, with the image data obtained by decoding compressed data of a frame format, thereby synthesizing one frame of image data.

\* \* \* \* \*